(12) United States Patent
Franklin et al.

(10) Patent No.: US 12,260,381 B1
(45) Date of Patent: Mar. 25, 2025

(54) ACTIVE OCR

(71) Applicant: Capital One Services, LLC, McLean, VA (US)

(72) Inventors: Keegan Franklin, Tucson, AZ (US); James Brighter, Reston, VA (US); Megan OBrien, New Orleans, LA (US); John Maillett, Arlington, VA (US); Jane Justiz, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/503,778

(22) Filed: Nov. 7, 2023

Related U.S. Application Data

(60) Provisional application No. 63/584,379, filed on Sep. 21, 2023.

(51) Int. Cl.
*G06Q 20/10* (2012.01)
*G06V 30/18* (2022.01)

(52) U.S. Cl.
CPC .......... *G06Q 20/108* (2013.01); *G06V 30/18* (2022.01)

(58) Field of Classification Search
CPC .............................. G06Q 20/108; G06V 30/18
See application file for complete search history.

(56) References Cited

U.S. PATENT DOCUMENTS

| | | | |
|---|---|---|---|
| 7,391,934 B2 | 6/2008 | Goodall et al. | |
| 7,421,107 B2 | 9/2008 | Lugg | |
| 7,587,066 B2 | 9/2009 | Cordery et al. | |
| 7,698,222 B1 | 4/2010 | Bueche | |

(Continued)

FOREIGN PATENT DOCUMENTS

| | | | | |
|---|---|---|---|---|
| CA | 3114180 A1 | * | 4/2020 | ............. G06Q 20/02 |
| CN | 107544916 A | * | 1/2018 | |

(Continued)

OTHER PUBLICATIONS

Brittain, Blake: USAA wins $218 mln. verdict from PNC in mobile-deposit tech trial, May 16, 2022, Reuters, pp. 1-9 (Year: 2022).*

(Continued)

*Primary Examiner* — Bijendra K Shrestha
(74) *Attorney, Agent, or Firm* — Sterne, Kessler, Goldstein & Fox P.L.L.C.

(57) ABSTRACT

A computer implemented method, system and non-transitory computer-readable device for a remote deposit environment activating, on a client device, a financial application, wherein the financial application is configured to instantiate a customer interface (UI) on the client device. Upon receiving a customer request, based on interactions with the UI, the method implements an electronic deposit of a financial instrument by activating a camera on the client device to generate a live stream of image data of a field of view of at least one camera, wherein the live stream includes imagery of at least a portion of the financial instrument. The method continues by extracting, based on the live stream of image data and by an optical character recognition program resident on the client device, one or more data fields from the financial instrument and communicating the extracted one or more data fields to a remote deposit server to complete the electronic deposit.

17 Claims, 7 Drawing Sheets

(56) References Cited

U.S. PATENT DOCUMENTS

| | | |
|---|---|---|
| 7,702,588 B2 | 4/2010 | Gilder et al. |
| 7,856,402 B1 | 12/2010 | Kay |
| 7,905,396 B2 | 3/2011 | Tidwell et al. |
| 7,949,587 B1 | 5/2011 | Morris et al. |
| 8,027,928 B1 | 9/2011 | Hecht, Jr. et al. |
| 8,050,997 B1 | 11/2011 | Nosek et al. |
| 8,060,442 B1 | 11/2011 | Hecht et al. |
| 8,296,230 B2 | 10/2012 | Davis et al. |
| 8,300,917 B2 | 10/2012 | Borgia et al. |
| 8,406,500 B2 | 3/2013 | Najari et al. |
| 8,464,933 B1 | 6/2013 | Prasad et al. |
| 8,582,862 B2 | 11/2013 | Nepomniachtchi et al. |
| 8,605,982 B2 | 12/2013 | Jackson et al. |
| 8,638,363 B2 | 1/2014 | King et al. |
| 8,688,579 B1 * | 4/2014 | Ethington .............. G06V 10/44 705/42 |
| 8,708,227 B1 | 4/2014 | Oakes, III et al. |
| 8,745,073 B1 | 6/2014 | Mulligan et al. |
| 8,811,711 B2 * | 8/2014 | Calman ................... G06V 30/40 382/137 |
| 8,958,605 B2 | 2/2015 | Amtrup et al. |
| 8,959,033 B1 | 2/2015 | Oakes, III et al. |
| 8,977,571 B1 * | 3/2015 | Bueche, Jr. .......... G06Q 20/042 705/45 |
| 8,995,012 B2 | 3/2015 | Heit et al. |
| 9,064,248 B2 | 6/2015 | Huff et al. |
| 9,324,073 B2 | 4/2016 | Nepomniachtchi et al. |
| 9,384,392 B2 | 7/2016 | Weber et al. |
| 9,569,756 B1 | 2/2017 | Bueche, Jr. et al. |
| 9,640,041 B2 | 5/2017 | Block et al. |
| 9,652,690 B2 | 5/2017 | Eid et al. |
| 9,672,510 B2 | 6/2017 | Roach et al. |
| 9,721,177 B2 | 8/2017 | Lee et al. |
| 9,747,509 B2 | 8/2017 | Eid et al. |
| 9,779,392 B1 | 10/2017 | Prasad et al. |
| 9,852,406 B2 | 12/2017 | Doyle et al. |
| 10,026,119 B2 | 7/2018 | Green et al. |
| 10,192,108 B2 | 1/2019 | Nepomniachtchi et al. |
| 10,210,522 B1 | 2/2019 | Medina et al. |
| 10,217,375 B2 | 2/2019 | Waldron et al. |
| 10,402,790 B1 | 9/2019 | Clark et al. |
| 10,460,381 B1 | 10/2019 | Pollack et al. |
| 10,504,185 B1 | 12/2019 | Buentello |
| 10,552,810 B1 | 2/2020 | Ethington et al. |
| 10,635,898 B1 | 4/2020 | Pribble et al. |
| 10,692,230 B2 | 6/2020 | Anderson et al. |
| 10,699,146 B2 | 6/2020 | Shustorovich et al. |
| 10,706,466 B1 | 7/2020 | Ethington et al. |
| 10,762,579 B2 | 9/2020 | Riechers et al. |
| 10,769,598 B1 * | 9/2020 | Oakes, III ............ G06Q 20/108 |
| 10,789,496 B2 | 9/2020 | Kotovich et al. |
| 10,853,771 B2 | 12/2020 | Enobakhare |
| 10,855,914 B1 | 12/2020 | Prasad et al. |
| 10,909,362 B2 | 2/2021 | Nepomniachtchi et al. |
| 11,064,111 B1 | 7/2021 | Prasad et al. |
| 11,127,008 B1 | 9/2021 | Buentello et al. |
| 11,145,169 B2 | 10/2021 | Pratten et al. |
| 11,157,731 B2 | 10/2021 | Nepomniachtchi et al. |
| 11,159,733 B2 | 10/2021 | Mukul |
| 11,200,550 B1 | 12/2021 | Singfield |
| 11,216,884 B1 * | 1/2022 | Buentello .............. G06Q 40/06 |
| 11,244,319 B2 | 2/2022 | Navarro et al. |
| 11,282,086 B1 | 3/2022 | Medina, III et al. |
| 11,295,377 B1 | 4/2022 | Ethington et al. |
| 11,295,378 B1 | 4/2022 | Voutour et al. |
| 11,315,217 B2 | 4/2022 | Ilic et al. |
| 11,321,709 B1 | 5/2022 | Kolchin |
| 11,373,150 B1 | 6/2022 | Bueche, Jr. et al. |
| 11,449,841 B1 | 9/2022 | Srinivasarangan et al. |
| 11,516,383 B2 | 11/2022 | Ilic et al. |
| 11,531,973 B2 | 12/2022 | Prasad et al. |
| 11,562,332 B1 | 1/2023 | Oakes, III et al. |
| 11,610,294 B2 | 3/2023 | Dewitt et al. |
| 11,640,627 B2 | 5/2023 | Fotso et al. |
| 11,676,285 B1 | 6/2023 | Backlund et al. |
| 11,694,268 B1 | 7/2023 | Buentello |
| 11,704,627 B2 | 7/2023 | Gordon et al. |
| 11,710,210 B1 | 7/2023 | Medina, III |
| 11,915,310 B1 * | 2/2024 | Voutour ............. G06Q 20/3276 |
| 2006/0036537 A1 | 2/2006 | Lawrence et al. |
| 2008/0140579 A1 | 6/2008 | Agarwal |
| 2012/0040717 A1 | 2/2012 | Levy et al. |
| 2013/0198069 A1 | 8/2013 | Latimer |
| 2013/0204783 A1 | 8/2013 | Klose et al. |
| 2014/0074697 A1 | 3/2014 | Foster |
| 2014/0075582 A1 * | 3/2014 | Hierro ................... H04L 63/062 726/30 |
| 2014/0114852 A1 | 4/2014 | Rajagopal et al. |
| 2014/0122332 A1 | 5/2014 | Viera et al. |
| 2015/0120564 A1 | 4/2015 | Smith et al. |
| 2017/0270508 A1 | 9/2017 | Roach et al. |
| 2020/0042955 A1 | 2/2020 | Widdows |
| 2020/0389600 A1 | 12/2020 | Capurso et al. |
| 2021/0360149 A1 | 11/2021 | Mukul |
| 2022/0180551 A1 * | 6/2022 | Lui .................... G06Q 30/0276 |
| 2022/0335393 A1 | 10/2022 | Gupta et al. |
| 2022/0343301 A1 | 10/2022 | Edwards et al. |
| 2022/0358575 A1 | 11/2022 | Smith |
| 2023/0060395 A1 | 3/2023 | Roach et al. |
| 2023/0060464 A1 | 3/2023 | Ceesay |
| 2023/0084370 A1 | 3/2023 | Bradford |
| 2023/0133158 A1 | 5/2023 | Kolchin |
| 2023/0196319 A1 | 6/2023 | Ng et al. |
| 2023/0196706 A1 | 6/2023 | Scott |
| 2023/0281629 A1 * | 9/2023 | Shevyrev ............... G06Q 40/02 705/44 |
| 2023/0351785 A1 * | 11/2023 | Fitzgerald .............. G06V 30/15 |

FOREIGN PATENT DOCUMENTS

| | | | | |
|---|---|---|---|---|
| CN | 111526382 B | * | 4/2022 | ............. G06K 9/344 |
| EP | 2136338 A1 | * | 12/2009 | ............... A45C 1/10 |

OTHER PUBLICATIONS

Geeksforgeeks: Java Program to Convert File to Byte Array, Apr. 22, 2022, pages1-11 (Year: 2022).*

Jung et al.: Real-time car tracking system based on surveillance video, 2018, EURASIP Journal of Image and Video Processiing, pp. 1-13 (Year: 2018).*

Njoku, Januarius: How to Convert Stream to Byte Array in C#, May 29, 2023, pp. 1-9 (Year: 2023).*

Brittain, Blake: USAA wins $218mil verdict from PNC in mobile-deposit tech trial, May 16, 2022, Reuters, pp. 1-9 (Year: 2022).*

Geeksforgeeks: Java Program to Convert File to Byte Array, Apr. 22, 2022, pp. 1-11 (Year: 2022).*

Adnan et al. an Analytical Study of Information Extraction from Unstructured and Multidimensional Big Data, 2019, Journal of Big Data, pp. 1-33 (Year: 2019).*

Smith, Ray: An Overview of the Tessseract OCR Engine, Sep. 2007, pp. 1-7 (Year: 2007).*

Ung et al.: Real-time car tracking system based on surveillance video, 2018, EURASIP Journal of Image and Video Processiing, pp. 1-13 (Year: 2018).*

Rose, Lydia M. "Modernizing check fraud detection with machine learning." PhD dissertation. Utica College. 2018.

remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (3 pgs).

* cited by examiner

ACTIVE OCR

BACKGROUND

Cross-Reference to Related Applications

This application claims priority to U.S. Provisional Patent Application 63/584,379, titled "Active OCR," filed Sep. 21, 2023, which is hereby incorporated by reference in its entirety.

As financial technology evolves, banks, credit unions and other financial institutions have found ways to make online banking and digital money management more convenient for customers. Mobile banking apps may let you check account balances and transfer money from your mobile device. In addition, a customer may deposit paper checks from virtually anywhere using their smartphone or tablet. However, customers need to take images with, for example, a scanner of the check to have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
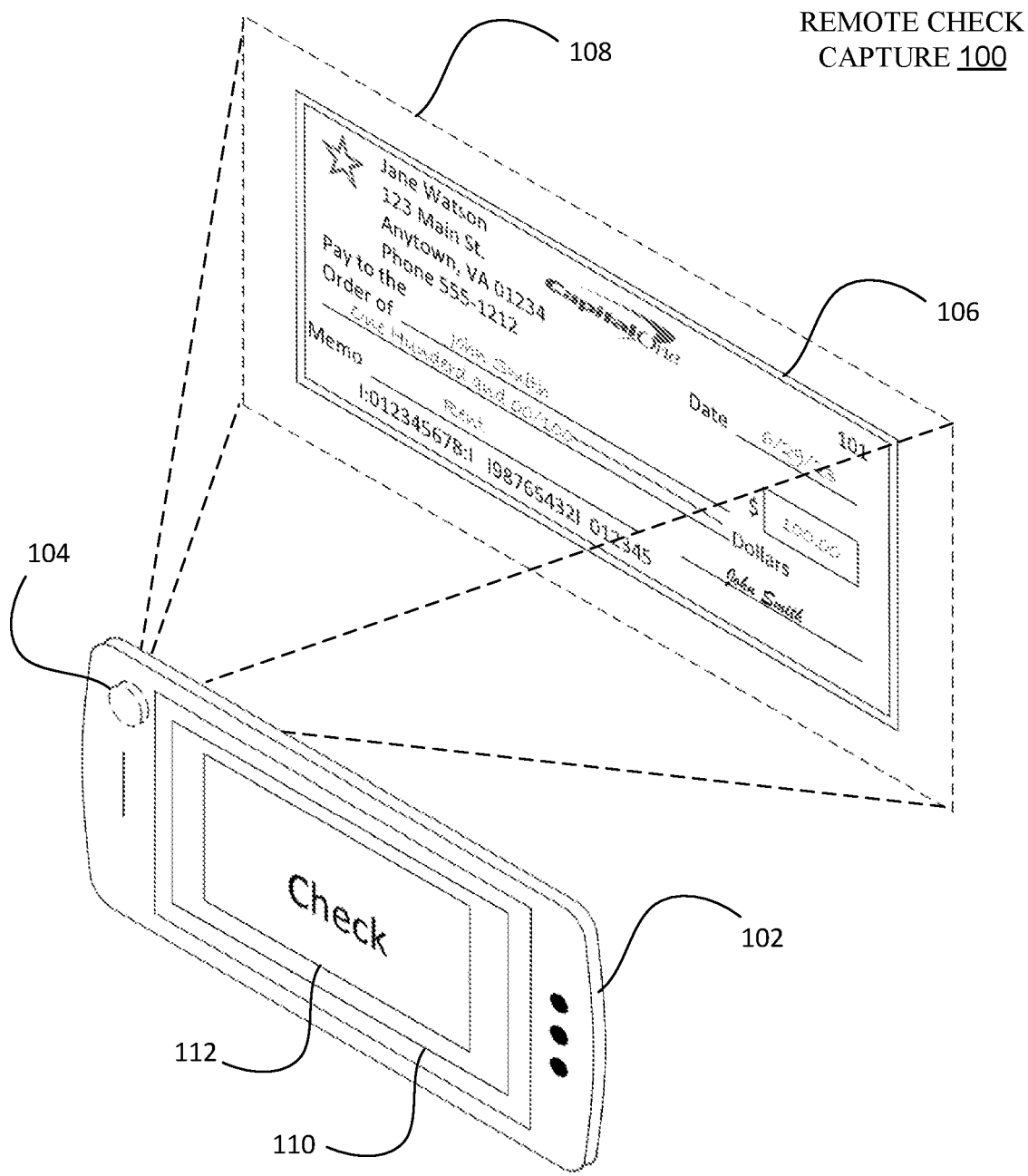
FIG. 1 illustrates an example remote deposit check capture, according to some embodiments and aspects.

Disclosed herein are system, apparatus, device, method and/or computer program product embodiments, and/or combinations and sub-combinations thereof for implementing active Optical Character Recognition (OCR) on a mobile or desktop computing device to assist, in real-time, a customer electronically depositing a financial instrument, such as a check. OCR is the electronic or mechanical conversion of images of typed, handwritten or printed text into machine-encoded text, whether from a scanned document, a photo of a document, a scene photo, stream of image data, etc. Utilizing this capability, data (e.g., check amount, signature, MICR line, account number, etc.) may be extracted from streamed imagery of the check, without requiring an image capture or remote OCR processing.

Currently, computer-based (e.g., laptop) or mobile-based (e.g., mobile device) technology allows a customer to initiate a document uploading process for uploading images or other electronic versions of a document to a backend system (e.g., a document processing system) for various purposes. In some cases, this technology prevents actions from being performed during the document upload process, i.e., while the document is being uploaded and processed by the backend system. That is, once the customer initiates the document upload process, the process will continue until completion without providing any opportunities for the customer to make any mid-stream adjustments to the process. This restrictive approach is necessitated in certain document upload processes because such processes have automated routines for receiving the images, processing the images, and completing actions associated with the upload of the images. For example, a customer may utilize a mobile deposit application to upload a document associated with a customer account, such as a check associated with the customer's bank account. Once initiated, the document upload process continues until the check has been uploaded without any further input from the customer. This current process is problematic because the customer is typically not given any information about the upload process until after the process has completed, when it is too late to cancel or otherwise make changes to the upload. In addition, mobile check applications typically capture the check deposit information without permanently storing the photos on the customer's mobile device (e.g., smartphone).

Mobile check deposit is a fast, convenient way to deposit funds using a customer's mobile device or laptop. As financial technology and digital money management tools continue to evolve, the process has become safer and easier than ever before. Mobile check deposit is a way to deposit a financial instrument, e.g., a paper check, through a banking app using a smartphone, tablet, laptop, etc. Currently, mobile deposit allows a bank customer to capture a picture of a check using, for example, their smartphone or tablet camera and upload it through a mobile banking app running on the mobile device. Deposits commonly include personal, business or government checks.

Most banks and financial institutions use advanced security features to keep an account safe from fraud during the mobile check deposit workflow. For example, security measures may include encryption and device recognition technology. In addition, remote check deposit apps typically captures check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity.

The technology described herein in the various aspects implements a pre-deposit local active OCR of imagery present in the camera's field of view, where the imagery is configured as a stream of live or continuously observed imagery. This imagery may be processed continuously, for example, in real-time, without first capturing an image in memory, or alternatively, the imagery may be stored temporarily within memory of the mobile device memory, such as, in an image buffer. In one aspect, the live camera imagery is streamed as encoded data configured as a byte array (e.g., as a Byte Array Output Stream object). The byte array is a group of contiguous (side-by-side) bytes, for example, forming a bitmap image. This local processing solution eliminates image capture requirements for OCR. Currently, image capture problems may be revealed by cancellations or additional requests to recapture images of the check, or a customer taking their deposit to another financial institution, causing a potential duplicate presentment fraud issue.

In the various embodiments and aspects disclosed herein, active OCR is able to OCR check images mid-experience instead of after submission. In some embodiments, the camera continuously streams image data until all of the data fields have been extracted from the imagery. In some embodiments, various check framing elements, such as a border or corners, assist in alignment of continuously streamed image data and corresponding Byte Array Output Stream objects. In some embodiments, success of the OCR extraction process may be determined based on reaching an extraction quality threshold. For example, if a trained ML OCR model reaches a determination of 85% surety of a correct data field extraction, then the OCR process for that field is completed. Utilizing this capability, the OCR'd data is communicated to a banking backend for additional remote deposit processing. Implementing the technology disclosed herein, the deposit may be processed by a mobile banking app and a remote deposit status rendered on a customer interface (UI) mid-experience. Alternatively, or in addition to, portions of the remote deposit sequence may be processed locally on the client device.

While described throughout for active OCR on the client device, the live stream of imagery may be communicated to one or more remote computing devices or cloud-based systems for performing a remote active OCR, without an image capture.

Figure 3:
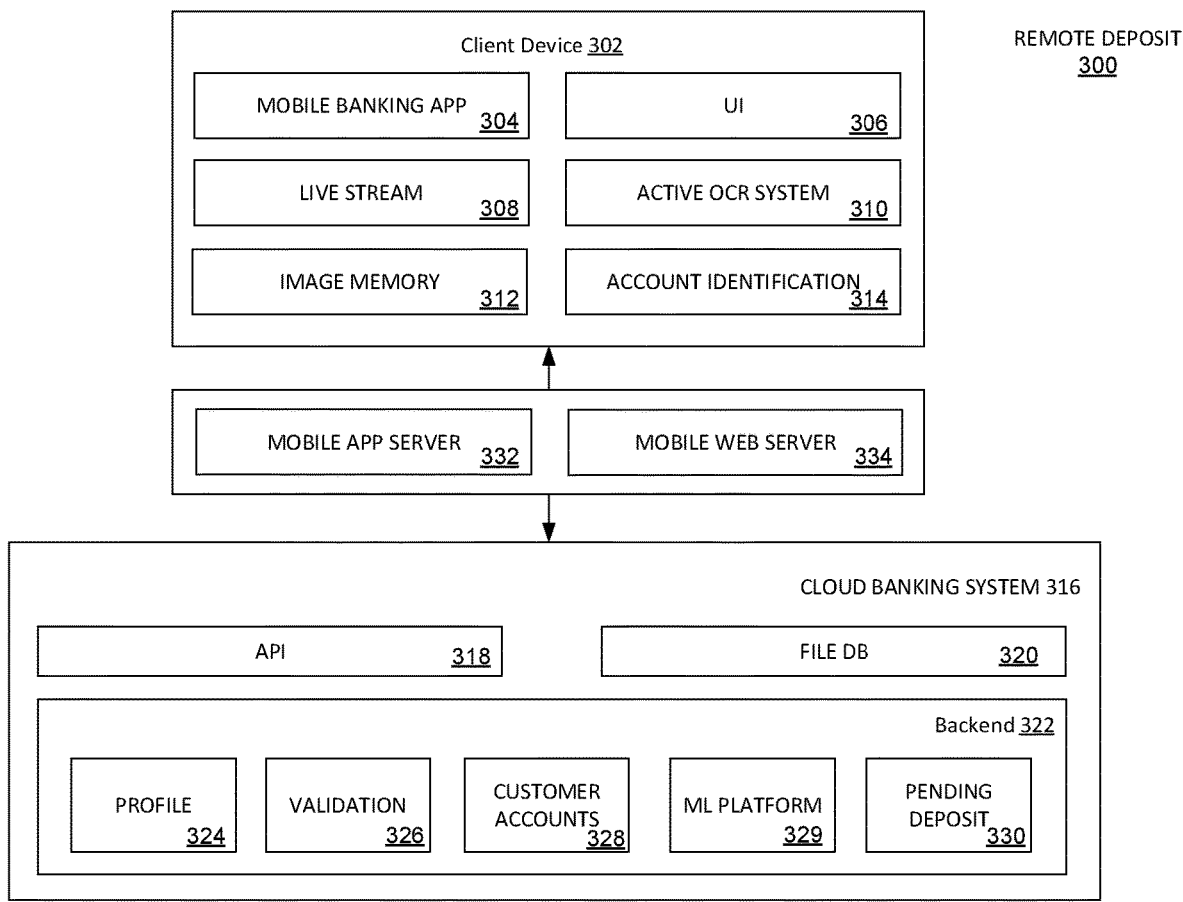
FIG. 3 illustrates a block diagram of a remote deposit system architecture, according to some embodiments and aspects.
Figure 4:
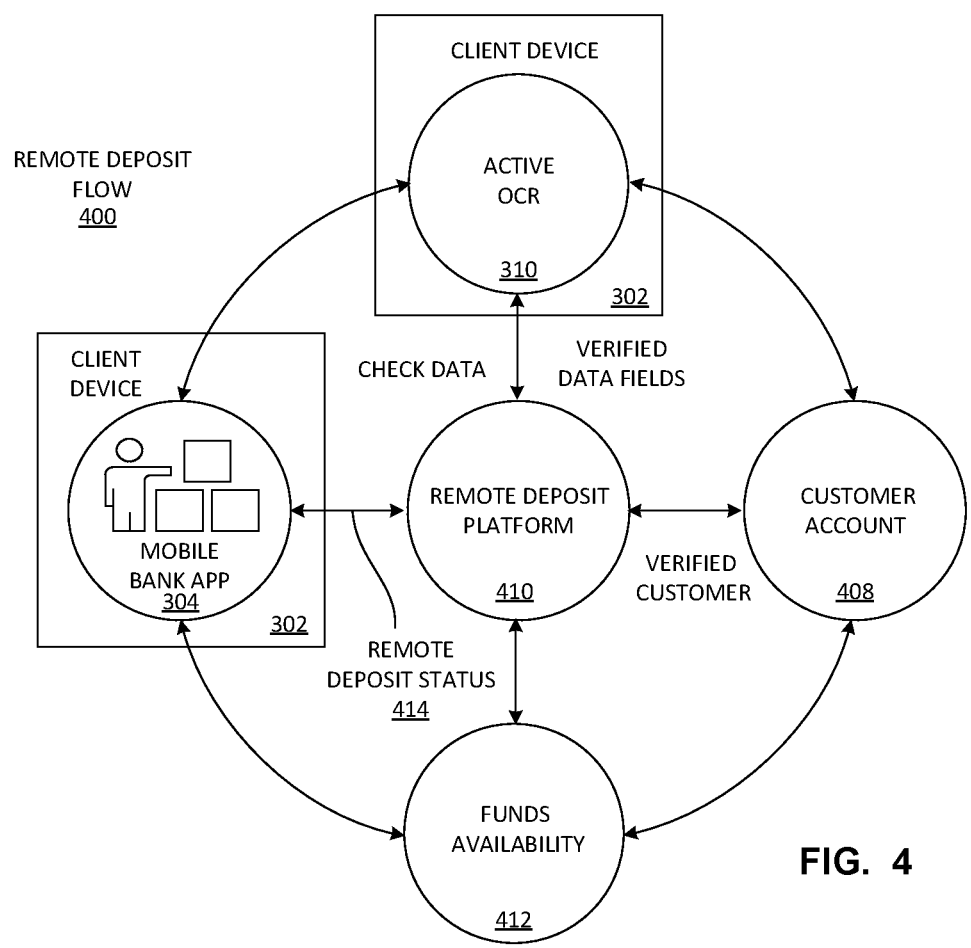
FIG. 4 illustrates an example flow diagram of a remote deposit system, according to some embodiments and aspects.
Figure 5:
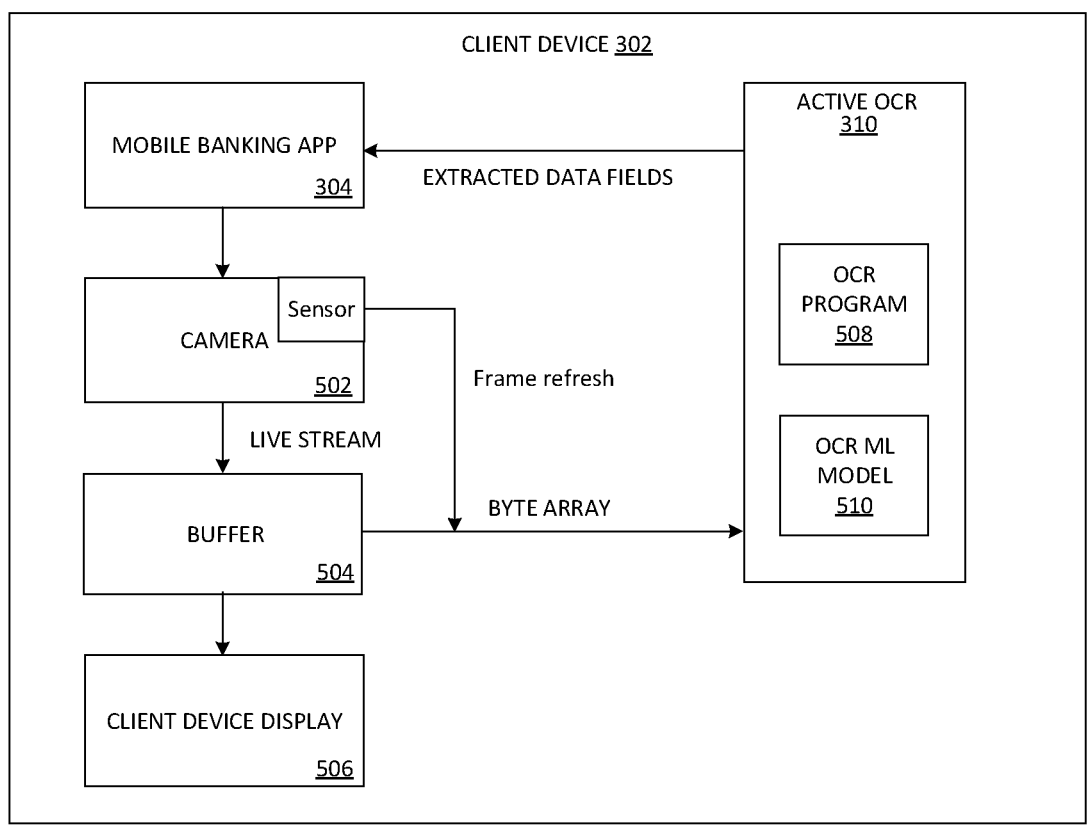
FIG. 5 illustrates an example diagram of a client computing device, according to some embodiments and aspects.

Various aspects of this disclosure may be implemented using and/or may be part of a remote deposit systems shown in FIGS. 3-5. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit system shall now be described.

FIG. 1 illustrates an example remote check capture 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check capture from their mobile computing device (e.g., smartphone) 102, but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a customer account at the bank account (e.g., checking or savings) into which the funds specified by the check are to be deposited. Content associated with the document include the funds or monetary amount to be deposited to the customer account, the issuing bank, the routing number, and the account number. Content associated with the customer account may include a risk profile associated with the account and the current balance of the account. Options associated with a remote deposit process may include continuing with the deposit process or cancelling the deposit process, thereby cancelling depositing the check amount into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104 (e.g., activate the camera). One skilled in the art would understand that variations of this approach or functionally equivalent alternative approaches may be substituted to initiate a mobile deposit.

Using the camera 104 function on the mobile computing device 102, the customer captures live imagery from a field of view 108 that includes at least a portion of one side of a check 106. Typically, the camera's field of view 108 will include at least the perimeter of the check 106. However, any camera position that generates in-focus check imagery 112 of the various data fields located on a check may be considered. Resolution, distance, alignment and lighting parameters may require movement of the mobile device until a proper view of a complete check, in-focus, has occurred. An application running on the mobile computer device may offer suggestions or technical assistance to guide a proper framing of a check within the mobile banking app's graphically displayed field of view window 110, displayed on a Customer Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 102. In an alternative embodiment, the remote deposit is implemented on a desktop computing device with an accompanying digital camera.

Sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've viewed a clear image of the front of the check, repeat the process on the back of the check," "Do you accept the funds availability schedule?," "Swipe the Slide to Deposit button to submit the deposit," "Your deposit request may have gone through, but it's still a good idea to hold on to your check for a few days,"

"keep the check in a safe, secure place until you see the full amount deposited in your account," and "After the deposit is confirmed, you can safely destroy the check." These instructions are provided as sample instructions or comments but any instructions or comments that guide the customer through a remote deposit session may be included.

Figure 2:
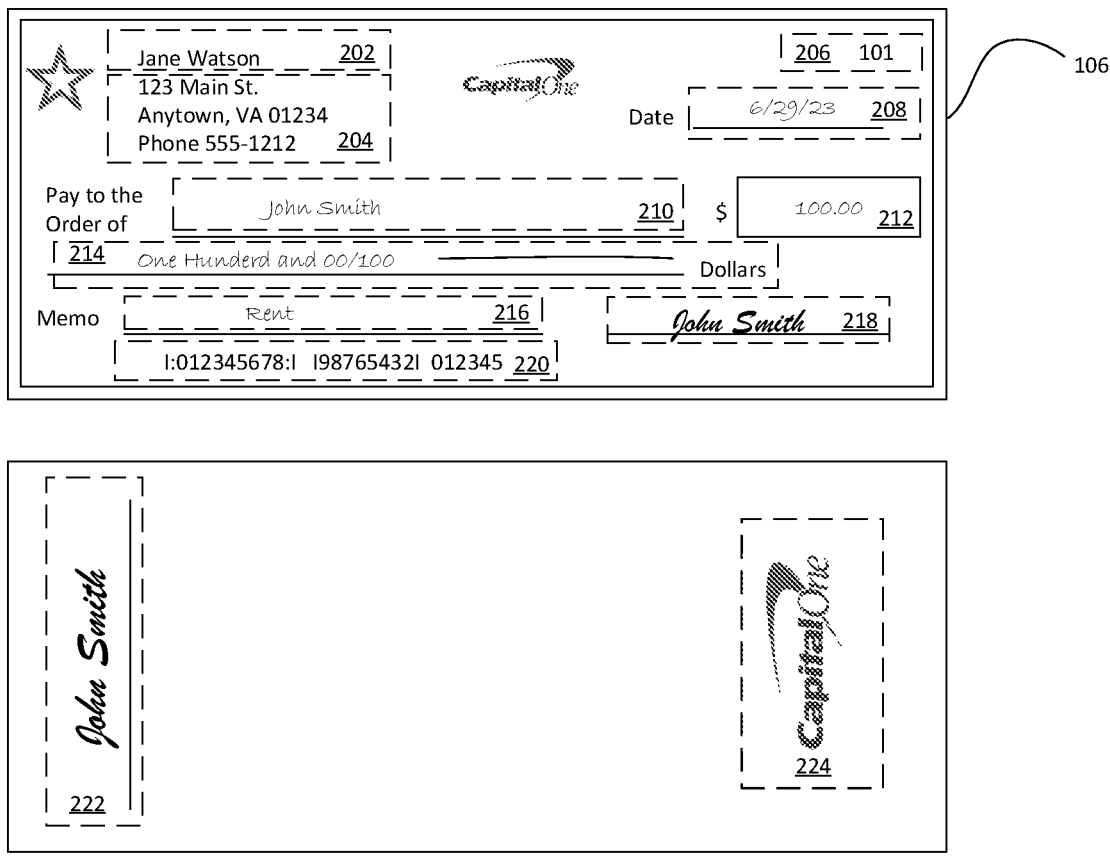
FIG. 2 illustrates example remote deposit OCR segmentation, according to some embodiments and aspects.

FIG. 2 illustrates example remote deposit OCR segmentation, according to some embodiments and aspects. Depending on check type, a check may have a fixed number of identifiable fields. For example, a standard personal check may have front side fields, such as, but not limited to, a payer customer name 202 and address 204, check number 206, date 208, payee field 210, payment amount 212, a written amount 214, memo line 216, Magnetic Ink Character Recognition (MICR) line 220 that includes a string of characters including the bank routing number, the payer customer's account number, and the check number and finally the payer customer's signature 218. Back side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in the mobile banking app running on the mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one aspect embodiment, active OCRing of a stream of check imagery may include implementing instructions resident on the customer's mobile device to process each of the field locations on the check as they are detected or systematically (e.g., ordered list extracted from a Byte Array Output Stream object). For example, the streaming check imagery may reflect a field of view pixel scan from left-to-right or from top-to-bottom with data fields identified within a frame of the check as they are streamed. In one non-limiting example, the customer holds their smartphone over a check (or checks) to be deposited remotely while the streaming field of view imagery is continuously OCR'd until data from each of required data fields has been extracted.

In a non-limiting example, the live streamed image data may be assembled into one or more frames of image content. In one aspect, a data signal from a camera sensor (e.g., CCD) notifies the banking app when an entire sensor has been read out as streamed data. In this approach, the camera sensor is cleared of electrons before a subsequent exposure to light and a next frame of an image captured. This clearing function may be conveyed as a frame refresh to the mobile banking app, or the OCR system, to indicate that the Byte Array Output Stream object constitutes a complete frame of image data. In some aspects, the images formed into a byte array may be first rectified to correct for distortions based on an angle of incidence, may be rotated to align the imagery, may be filtered to remove obstructions or reflections, and may be resized to correct for size distortions using known image processing techniques. In one aspect, these corrections may be based on recognition of corners or borders of the check as a basis for image orientation and size, as is known in the art.

While any portion of a byte array may be OCR'd during data field captures, in some aspect embodiments, a Byte Array Output Stream object of an entire frame, or multiple frames, may be OCR'd sequentially until all data fields have been extracted. For example, five data fields may be extracted from a first Byte Array Output Stream object, while the remaining data fields may be extracted from one or more subsequent Byte Array Output Stream objects. Extracting data fields from a plurality of byte array output stream objects is further described in U.S. Provisional Application 63/589,233, entitled "Intelligent Document Field Extraction From Multiple Image Objects," filed Oct. 10, 2023, and incorporated by reference in its entirety. The extraction process may include sequentially OCR processing the byte array objects based on a highest image quality using confidence scores. Alternatively, or in addition to, a Byte Array Output Stream object of multiple frames may be graphically overlaid (e.g., in a multi-layer image buffer) or virtually overlaid (e.g., in a virtual image buffer) to form a blended image and OCR'd until all data fields have been extracted. For example, content from common pixels, from each image frame or portion of a frame, may be weighted and aggregated to form a blended image of at least a threshold level of quality prior to the OCR process. This build process is further described in U.S. Provisional Application 63/589,230, entitled "Burst Image Capture," filed Oct. 10, 2023, and incorporated by reference in its entirety.

In another example embodiment, fields that include typed information, such as the MICA line 220, check number 206, payer customer name 202 and address 204, etc., may be OCR'd first from the Byte Array Output Stream object, followed by a more complex or time intensive OCR process of identifying written fields, such as the payee field 210, signature 218, to name a few.

In another example embodiment, artificial intelligence (AI), such as machine-learning (ML) systems train an OCR model(s) to recognize characters, numerals or other check data within the data fields of the streamed imagery. The OCR model is resident on the mobile device and may be integrated with or be separate from the mobile banking application. The OCR model may be continuously updated by future transactions used to train the OCR model(s). ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific OCR process to capture relationships between concepts (e.g., image clarity vs. recognition of specific characters or numerals) and an OCR success history. The classifier (discriminator) is trained to distinguish (recognize) variations. Different variations may be classified to ensure no collapse of the classifier and so that variations can be distinguished.

In some aspects, machine learning models are trained on a remote machine learning platform (e.g., see FIG. 3, element 329) using other customer's transactional information (e.g., previous OCR data extractions). In addition, large training sets of the other customer's historical information may be used to normalize prediction data (e.g., not skewed by a single or few occurrences of a data artifact). Thereafter, an OCR predictive model(s) may classify a specific OCR data field extraction against the trained predictive model to predict required imagery quality and generate or enhance a previous generated OCR query based provided metadata (resolution, focal length, etc.). In one embodiment, the OCR models are continuously updated as new financial transactions occur.

In some aspects, a ML engine may continuously change weighting of model inputs to increase customer interactions with the OCR procedures. For example, weighting of specific data fields may be continuously modified in the model to trend towards greater success, where success is recognized by correct data field extractions or by completed remote deposit transactions. Conversely, term weighting that lowers successful OCR interactions may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application, the mobile banking app may be configured to run on desktop computers, and web applications, which run in mobile web browsers rather than directly on a mobile device. Apps are broadly classified into three types: native apps, hybrid and web apps. Native applications are designed specifically for a mobile operating system, typically iOS or Android. Web apps are written in HTML5 or CSS and typically run through a browser. Hybrid apps are built using web technologies such as JavaScript, CSS, and HTML5 and function like web apps disguised in a native container.

Financial instrument imagery may originate from any of, but not limited to, image streams (e.g., series of pixels or frames) or video streams or a combination of any of these or future image formats. A customer of a client device 302, operating a mobile banking app 304 through an interactive UI 306, frames at least a portion of a check (e.g., identifiable fields on front or back of check) with a camera (e.g., field of view). In one aspect, imagery is processed from live stream check imagery 308, as communicated from a camera over a period of time, until an active OCR operation has been completed. In one aspect, the camera imagery is streamed as encoded text, such as a byte array. Alternatively, or in addition to, the live imagery is buffered by storing (e.g., at least temporarily) as images or frames in computer memory. For example, live streamed check imagery 308 is stored locally in image memory 312, such as, but not limited to, a frame buffer, a video buffer, a streaming buffer, or a virtual buffer.

Active OCR system 310, resident on the client device 302, processes the live streamed check imagery 308 to extract data by identifying specific data located within known sections of the check to be electronically deposited. In one non-limiting example aspect, single identifiable fields, such as the payer customer name 202, MICR data field 220 identifying customer and bank information (e.g., bank name, bank routing number, customer account number, and check number), date field 208, check amount 212 and written amount 213, and authentication (e.g., payee signature 222) and anti-fraud 223 (e.g., watermark), etc. are processed by the active OCR system 310. In some aspects disclosed herein, the active OCR 310 process is completed before finalization of a remote deposit operation.

Account identification 314 uses single or multiple level login data from mobile banking app 304 to initiate a remote deposit. Alternately, or in addition to, the extracted payee field 210 or the payee signature 222 may be used to provide additional authentication of the customer.

Active OCR system 310 communicates data extracted from the one or more data fields during the active OCR operation to cloud banking system 316. For example, the extracted data identified within these fields is communicated to file database (DB) 320 either through a mobile app server 332 or mobile web server 334 depending on the configuration of the client device (e.g., mobile or desktop). In one aspect, the extracted data identified within these fields is communicated through the mobile banking app 304.

Alternatively, or in addition to, a thin client (not shown) resident on the client device 302 processes extracted fields locally with assistance from cloud banking system 316. For example, a processor (e.g., CPU) implements at least a portion of remote deposit functionality using resources stored on a remote server instead of a localized memory. The thin client connects remotely to the server-based computing environment (e.g., cloud banking system 316) where applications, sensitive data, and memory may be stored.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a mobile edge server (not shown) within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316, or third party systems or data.

Customer Accounts 328 (consistent with customer's accounts 408) includes, but is not limited to, a customer's financial banking information, such as individual, joint, or commercial account information, balances, loans, credit cards, account historical data, etc.

ML Platform 329 may include a trained OCR model or a ML engine to train an OCR model(s) used to extract and process OCR data. This disclosure is not intended to limit the ML Platform 329 to only OCR model generation as it may also include, but not be limited to, remote deposit models, risk models, funding models, security models, etc.

When remote deposit status information is generated, it is passed back to the client device 302 through API 318 where it is formatted for communication and display on the client device 302 and may, for example, communicate a funds availability schedule for display or rendering on the customer's device through the mobile banking app UI 306. The UI may instantiate the funds availability schedule as images, graphics, audio, additional content, etc.

Pending deposit 330 includes a profile of a potential upcoming deposit(s) based on an acceptance by the customer through UI 306 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 302, third party platforms, the cloud-based banking system 316, or distributed across multiple computer-based systems. The UI may instantiate the remote deposit status as images, graphics, audio, additional content, etc. In one technical improvement over current processing systems, the remote deposit status is provided mid-stream, prior to completion of the deposit. In this approach, the customer may terminate the process prior to completion if they are dissatisfied with the remote deposit status.

In one aspect embodiment, remote deposit system 300 tracks customer behavior. For example, did the customer complete a remote deposit operation or did they cancel the request? In some aspects, the completion of the remote deposit operation reflects a successful outcome, while a cancellation reflects a failed outcome. In some aspects, this customer behavior, not limited to success/failure, may be fed back to the ML platform 329 to enhance future training of a remote deposit model. For example, in some embodiments, one or more inputs to the ML remote deposit models may be weighted differently (higher or lower) to effect a predicted higher successful outcome.

FIG. 4 illustrates an example flow diagram of a remote deposit system, according to some embodiments and aspects. The remote deposit 400 flow may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In one non-limiting example, a customer of a client device 302 (e.g., smartphone 102), operating a mobile banking app 304, frames at least a portion of a check within a field of view from an active camera (e.g., camera activated) of client device 302. As previously described, the imagery within the field of view may, in one aspect, be configured as a live stream. In one aspect, the camera imagery is streamed as encoded text, such as a byte array (e.g., as a Byte Array Output Stream object). This live stream of image data is processed, without requiring an image capture, using a client device resident active OCR 310 system (e.g., program or ML model). Active OCR 310 is defined as performing OCR on a live stream of image data within a current customer transaction time period. The active OCR generates data from a plurality of fields of the check. For example, the active OCR extracts or identifies a check date, check number, payer, payee, amount, payee information and bank information, to name a few.

While extracting identifiable data from surfaces of the check is a primary output of the active OCR, additional post-processing may be needed to further confirm or verify the data. Additional post active OCR processing may include, but is not limited to, verification of data extracted from the fields based on a comparison with historical customer account data found in the customer's account 408 or the payer's account. The customer account 408, for purposes of description, may be the payee's account, the payer's account or both. For example, a payee's account historical information may be used to calculate a payee's funds availability 412 schedule, while a payer's account may be checked for funds to cover the check amount. In one non-limiting example, an address may be checked against the current address found in a data file of customer account 408. In another non-limiting example, post active OCRing processing may include checking a signature file within customer account 408 to verify the payee or payer signatures. It is also contemplated that a third party database can be checked for funds and signatures for checks from payors not associated with the customer's bank. Additional known OCR post processing techniques may be substituted without departing from the scope of the technology described herein.

Remote deposit platform 410 receives the extracted data fields of the check from the client device 302. In one non-limiting example aspect, single identifiable fields, such as the check field 206, date field 208, payee field 210, amount field 212, etc. are sequentially communicated by the active OCR system 310 and communicated in real-time as they are detected and OCR'd. For example the MICR line 220 that includes a string of characters including the bank routing number, the MICR, including at least the customer's account number, may be processed early on to immediately initiate a verification of the customer, while the active OCR processes the remaining fields. In another non-limiting example, the amount fields may be processed to initiate a funds availability process before the remaining data fields have been extracted. Alternatively, or in addition to, the active OCR process may have a time ordered sequence of fields to be processed. Alternatively, or in addition to, all identifiable check fields are processed simultaneously in parallel by the active OCR system 310.

Active OCR system 310 communicates one or more data fields extracted in the OCR operation to a funds availability model 412. For example, active OCR 310 communicates customer data (e.g., name, address, account number, bank information (e.g., routing information), check number, check amount (e.g., funding amount needed), authorization and anti-fraud information (e.g., signature verifications, watermark or other check security imagery), etc. Funds availability model 412 may return a fixed or dynamically modifiable funds availability schedule to the UI 306 on the client device 302.

Client device 302 may also obtain a check image using a camera 104. The check images, including the front and back of the check, are transmitted along with the active OCR data. The check images can then be stored in the customer account 408 for later use if necessary. However, the processing of the active OCR data is independent of the check images taken by the camera 104. In other words, the check deposit can be completed without processing the check images.

Remote deposit platform 410 computes a funds availability schedule based on one or more of the received data fields, customer history received from the customer's account 408, bank funding policies, legal requirements (e.g., state or federally mandated limits and reporting requirements, etc.), or typical schedules stored within funds availability platform 412, to name a few. For example, the active OCR system 310 identifies the MICR data as a verified data fields that may be used to access a customer's account 408. This access allows the bank identified in the MICR to provide a history of the customer's account 408 to the Remote deposit platform 410. Early access to the customer's account also may also provide a verified customer for security purposes to eliminate or reduce fraud early in the remote deposit process.

Remote deposit platform 410 communicates a remote deposit status 414 to the customer's device. For example, the acceptance of the active OCR processed data is communicated. Alternatively, a request to continue pointing the camera at one or more sides of the check is communicated to and rendered as on-screen instructions on the client device 302, within one or more customer interfaces (UIs) of the customer device's mobile banking app 304. The rendering may include imagery, text, or a link to additional content. The UI may instantiate the remote deposit status 414 as images, graphics, audio, etc. In one technical improvement over current processing systems, the remote deposit status is provided mid-stream, prior to completion of the deposit. In this approach, the customer may terminate the process prior to completion if they are dissatisfied with the remote deposit status 414.

In one aspect embodiment, remote deposit platform 410 tracks customer behavior. For example, did the customer complete a remote deposit operation or did they cancel the request. In some aspects, the completion of the remote deposit operation reflects a successful outcome, while a cancellation reflects a failed outcome. In some aspects, this customer behavior, not limited to success/failure, may be fed back to a ML system 339 within the remote deposit platform 410 to enhance future training of a ML OCR model or remote deposit models. For example, in some embodiments, one or more inputs to the ML funding models may be weighted differently (higher or lower) to effect a predicted higher successful outcome.

Alternatively, or in addition to, one or more components of the remote deposit flow may be implemented within the customer device, third party platforms, and a cloud-based system or distributed across multiple computer-based systems.

FIG. 5 illustrates an example diagram of a client device 302, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

In one aspect embodiment, the mobile banking app 304 is opened on the client device 302 and the deposit check function selected to initiate a remote deposit process. A camera is activated (e.g., camera 502) to communicate a live stream of imagery (e.g., frames of video) from a field of view of the camera 502. A camera may output, for display at client display device 506, a frame (e.g., an image frame or a frame of a video, for example) having one or more images (e.g., images of real-world objects) that are viewable by camera 502. An image frame may include one or more images that may represent one or more real-world objects. For instance, an image may represent an entire group of checks in a field of view of camera 502, or the image may represent one or more individual objects within the group. In one aspect, the image of decodable check indicia can be provided by a raw image byte stream or by a byte array, a compressed image byte stream or byte array, and/or a partial compressed image byte stream or byte array.

At this point, the customer of the client device 302 may view the live stream of imagery on a UI of the client device display 506, after buffering in buffer 504 (e.g., frame buffer, video buffer, etc.). In some aspects, the live stream is communicated to the active OCR as a raw image live stream. In some aspects, the raw image live stream is first converted to a byte array and then communicated to the active OCR system 310 (buffered or not buffered). The data embedded in the byte stream or byte array, is then extracted by program instructions of an OCR program 508 of active OCR system 310 and saved to memory of the client device 302. This extracted data may be continuously transmitted, periodically transmitted or be transmitted after completion of the active OCR (e.g., after all data fields are extracted), as check data fields to a cloud banking system 316 via a network connection.

In one aspect, the front side imagery is processed followed by the back side imagery. Alternatively, or in combination, the front side and back side imagery is processed together or in parallel.

In some embodiments, the remote deposit platform 410, as described in FIG. 4, may be used to assist implementation of the localized mobile device active OCR 310 processing. In a non-limiting example, computer vision algorithms may use large language models (LLM). A large language model is a language model characterized by emergent properties enabled by its large size. As language models, they work by taking an input text and repeatedly predicting the next token or word. They are built with artificial neural networks, pre-trained using self-supervised learning and semi-supervised learning, typically containing tens of millions to billions of weights. In some aspects, LLM includes Natural Language Processing (NLP). One goal is a computer capable of "understanding" the contents of images, including the contextual nuances of the language within them. The technology can then accurately extract information and insights contained in the images as well as categorize and organize the images or fields within images themselves. LLM and NLP functionality may be implemented on the remote deposit platform 410 to train and improve the previously described ML OCR models 510 that may be operative with the mobile device for the localized active OCR processing.

The technical solution disclosed above allows active OCRing of live imagery, without first requiring an image capture, communication thereof and remote OCRing of a captured image. This solution set accelerates the remote check deposit process and allows mid-stream alterations or improvements, for example, real-time image quality guidance or customer inputs (e.g., mid-stream cancelation).

Figure 6:
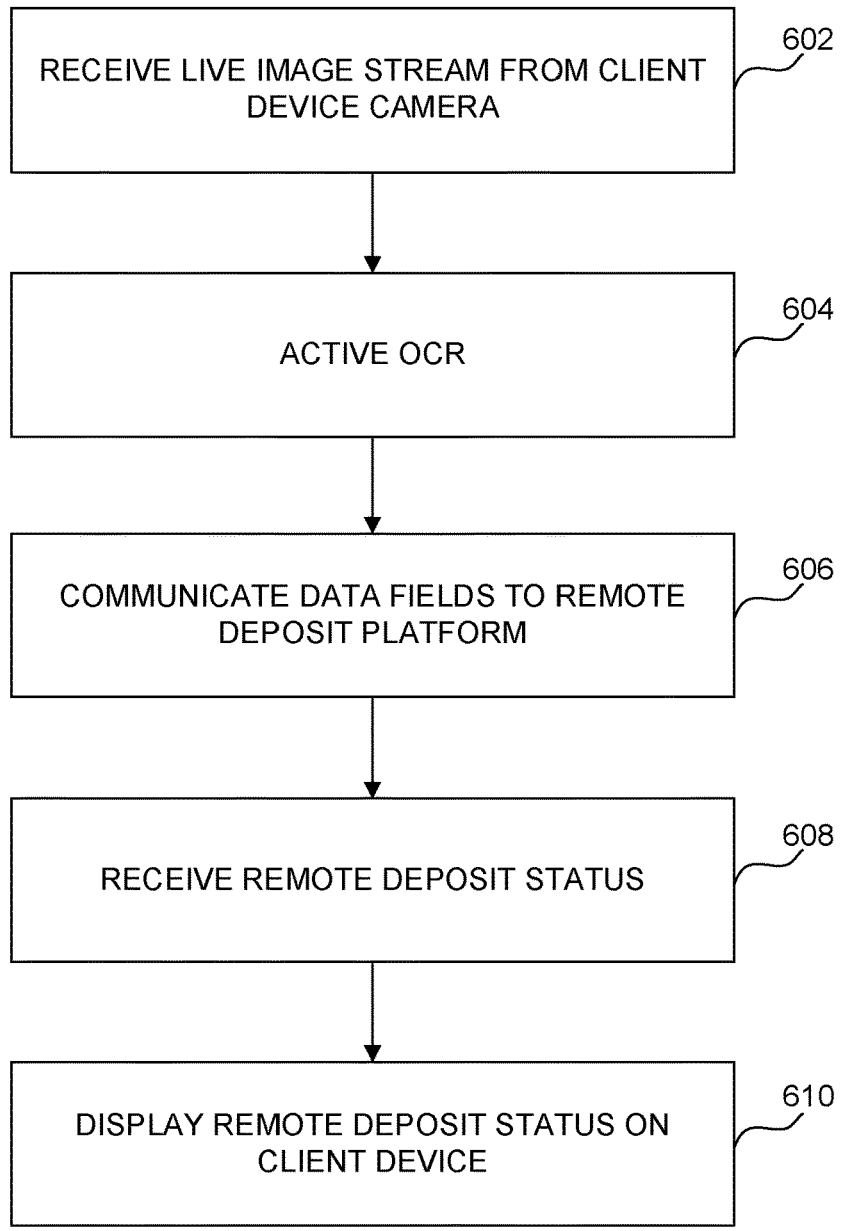
FIG. 6 illustrates a flow diagram for a remote deposit system, according to embodiments and aspects.

FIG. 6 is a flow chart 600 depicting an active OCR remote check deposit method that can be carried out in line with the discussion above. One or more of the operations in the method depicted by FIG. 6 could be carried out by one or more entities, including, without limitation, client device 302, remote deposit platform 410, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described generate and instantiate an active OCR process for a mobile banking app 304.

In 602, a mobile banking app 302 instantiates a remote deposit by activating a client device 302 camera (e.g., opening a camera port). For example, a customer of a mobile computing device, operating a mobile banking app, initiates a remote deposit by selecting this option on a UI of the banking mobile app on their mobile computing device. This selection provides instructions to the camera to communicate image data from the field of view of the camera. In one aspect, the image data is communicated as a raw live image stream to a resident real-time active system 310. In one aspect, the raw live image stream is first converted to a byte array and then communicated as a live byte array stream to a resident active OCR system 310. In one aspect, the image data is continuously communicated to active OCR system 310. In another aspect, the image data is buffered before or during communication to adjust for processing bandwidth or discrete stages of OCRing (e.g., specific data field active OCR).

In 604, active OCR system 310 performs localized active OCR on the received live image stream. Active OCR is defined as performing OCR on a live imagery stream during a current customer transaction time period. For example, the active OCR process is completed before finalization of a remote deposit operation. In one aspect, a ML OCR model 510, previously trained on other OCR transactions, improves a standard active OCR process by intelligently extracting data based on an historical understanding of previously successful or failed active OCR transactions.

In 606, active OCR system 310 communicates one or more data fields extracted in the active OCR operation to a remote deposit platform 410. For example, active OCR 310 communicates customer data (e.g., name, address, account number, bank information (e.g., routing information), check number, check amount (e.g., funding amount needed), authorization and anti-fraud information (e.g., signature verifications, watermark or other check security imagery), etc. In an alternative embodiment, one or more portions of the described remote deposit processing is implemented locally on the client device 302.

In 608, the client device 302 receives, from a remote deposit platform 410, a status of the remote deposit as it moves from initiation to completion. Non-limiting examples of the status may include, but not be limited to, success or failure of the active OCR process, a fraud alert, a computed funds availability schedule, bank funding policies, legal requirements (e.g., state or federally mandated limits and reporting requirements, etc.), or a failed or completed remote deposit.

In 610, the client device 302 displays the status of the remote deposit. For example, a funding schedule is communicated to and rendered on-screen of a customer's device within one or more customer interfaces (UIs) of the customer device's mobile banking app. The UI may instantiate the status of the remote deposit as images, graphics, audio, additional content, etc.

The remote deposit platform 410 optionally tracks customer behavior. For example, did the customer complete a remote deposit operation after seeing the funds availability schedule or did they cancel the request. In some aspects, the completion of the remote deposit operation reflects a successful outcome, while a cancellation reflects a failed outcome. In some aspects, this customer behavior, not limited to success/failure, may be fed back to the remote deposit platform 410 to enhance future training of the ML models. For example, in some embodiments, one or more inputs to the ML funding models may be weighted differently (higher or lower) to effect a predicted higher successful outcome.

In the various embodiments and aspects disclosed herein, the technology disclosed herein may implement fraud controls that will return a specific flag if the customer is eligible for a remote deposit experience. If they are eligible, the remote deposit active OCR and real-time remote deposit status will be shown on the UI of the app. If not, they may receive a standard message, such as, "remote deposit is currently not available".

The solutions described above join several key technical components that are lacking in the current remote deposit funding alerts. The various aspects solve at least the technical problems associated with performing OCR operations pre-deposit, without requiring an image capture. The various embodiments and aspects described by the technology disclosed herein are able to provide active OCR operations and remote deposit status mid-experience, before the customer completes the deposit and without requiring the customer to provide additional new image captures post image quality or OCR failures.

Example Computer System

Figure 7:
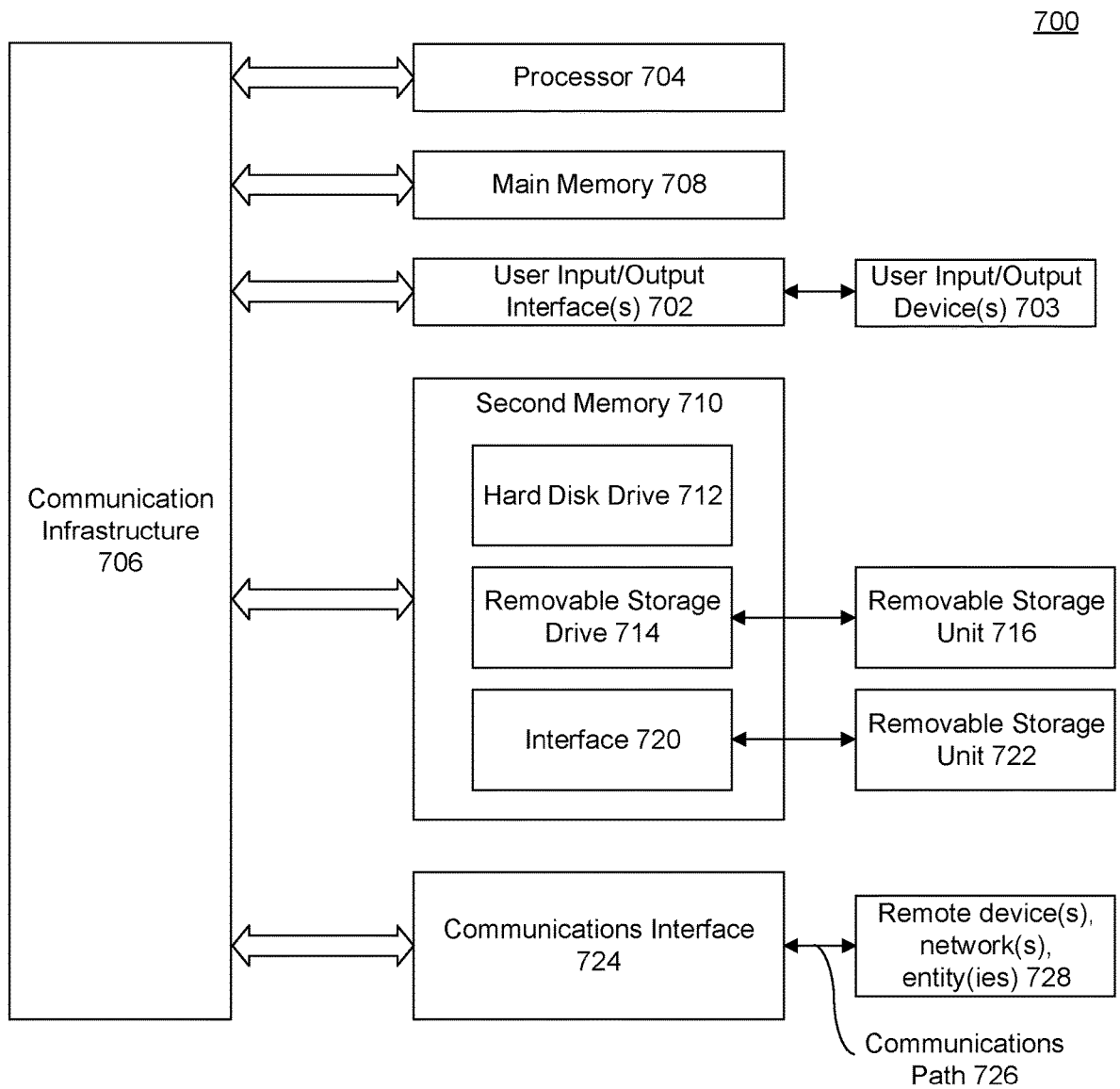
FIG. 7 illustrates an example computer system useful for implementing various embodiments and aspects.

FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof. For example, the example computer system may be implemented as part of mobile computing device 102, client device 302, cloud banking system 316, etc. Cloud implementations may include one or more of the example computer systems operating locally or distributed across one or more server sites.

Computer system 700 may include one or more processors (also called central processing units, or CPUs), such as a processor 704. Processor 704 may be connected to a communication infrastructure or bus 706.

Computer system 700 may also include customer input/output device(s) 702, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 716. Removable storage unit 716 may include a computer usable or readable storage device having stored thereon computer software (control logic) and/or data. Removable storage unit 716 may be a floppy disk, magnetic tape, compact disk, DVD, optical storage disk, and/any other computer data storage device. Removable storage drive 714 may read from and/or write to removable storage unit 716.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML Customer Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 716 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer implemented method for a remote deposit environment, comprising:
   receiving a customer request, based on interactions with an application that is configured to instantiate a user interface (UI) on a client device, to electronically deposit a financial instrument;
   based on the customer request, activating a camera on the client device to generate a live stream of image data of a field of view of the camera, wherein the live stream includes imagery of at least a portion of the financial instrument;
   converting, by the client device, the live stream to a plurality of byte arrays, wherein a first byte array of the plurality of byte arrays includes at least a first data field of the financial instrument and a second byte array of the plurality of byte arrays includes at least a second data field of the financial instrument;
   extracting, by the client device, from the plurality of byte arrays and by an optical character recognition (OCR) program resident on the client device, the first data field from the first byte array and the second data field from the second byte array; and
   communicating, by the client device, the extracted first and second data fields to a remote deposit server.

2. The computer implemented method of claim 1, wherein the live stream comprises a raw image live stream.

3. The computer implemented method of claim 1, wherein the plurality of byte arrays each comprises a byte array output stream object.

4. The computer implemented method of claim 1, wherein the remote deposit server is configured to process at least the first and second data fields to complete the remote deposit.

5. The computer implemented method of claim 1, wherein the optical character recognition program is configured with a trained machine learning OCR model.

6. The computer implemented method of claim 1, wherein the client device is a mobile client device.

7. A system, comprising:
   a memory; and
   at least one processor coupled to the memory and configured to:
   receive a customer request, based on interactions with an application that is configured to instantiate a user interface (UI) on a client device, to deposit a financial instrument;
   based on the customer request, activate a camera on the client device to generate a live stream of image data of a field of view of the camera, wherein the live stream includes imagery of at least a portion of the financial instrument;
   convert, by the client device, the live stream to a plurality of byte arrays, wherein a first byte array of the plurality of byte arrays includes at least a first data field of the financial instrument and a second byte array of the plurality of byte arrays includes at least a second data field of the financial instrument;
   extract, by the client device, based on the plurality of byte arrays and by an optical character recognition (OCR) program resident on the client device, the first data field from the first byte array of the plurality of byte arrays and the second data field from the second byte array of the plurality of byte arrays; and
   communicate, by the client device, the extracted first and second data fields to a remote deposit server.

8. The system of claim 7, wherein the live stream comprises a raw image live stream.

9. The system of claim 7, wherein the plurality of byte arrays each comprises a byte array output stream object.

10. The system of claim 7, wherein the remote deposit server is configured to process at least the first and second data fields to complete the deposit.

11. The system of claim 7, wherein the optical character recognition program is configured with a trained machine learning OCR model.

12. The system of claim 7, wherein the client device is a mobile client device.

13. A non-transitory computer-readable device having instructions stored thereon that, when executed by at least one computing device, causes the at least one computing device to perform operations comprising:
   receiving a customer request, based on interactions with an application that is configured to instantiate a user interface (UI) on a client device, to electronically deposit a financial instrument;
   based on the customer request, activating a camera on the client device to generate a live stream of image data of a field of view of the camera, wherein the live stream includes imagery of at least a portion of the financial instrument;
   converting, by the client device, the live stream to a plurality of byte arrays, wherein a first byte array of the plurality of byte arrays includes at least a first data field of the financial instrument and a second byte array of the plurality of byte arrays includes at least a second data field of the financial instrument;

extracting, by the client device, based on the plurality of byte arrays and by an optical character recognition (OCR) program resident on the client device, the first data field from the first byte array of the plurality of byte arrays and the second data field from the second byte array of the plurality of byte arrays; and communicating, by the client device, the extracted first and second data fields to a remote deposit server.

14. The non-transitory computer-readable device of claim 13, wherein the live stream comprises a raw image live stream.

15. The non-transitory computer-readable device of claim 13, wherein the plurality of byte arrays each comprises a byte array output stream object.

16. The non-transitory computer-readable device of claim 13, wherein the optical character recognition program is configured with a trained machine learning OCR model.

17. The non-transitory computer-readable device of claim 13, wherein the remote deposit server is configured to process at least the first and second data fields to complete the deposit.

\* \* \* \* \*